(12) United States Patent
Sreenivasan et al.

(10) Patent No.: US 12,196,091 B2
(45) Date of Patent: Jan. 14, 2025

(54) AIRCRAFT AUXILIARY POWER UNIT (APU) CONTROLLERS AND RELATED METHODS

(71) Applicant: The Boeing Company, Chicago, IL (US)

(72) Inventors: Mohan Sreenivasan, Bangalore (IN); Animesh Mukherjee, Bangalore (IN); Manikandan Murugesan, Bangalore (IN); Utkarsh Palav, Bangalore (IN)

(73) Assignee: The Boeing Company, Arlington, VA (US)

( * ) Notice: Subject to any disclaimer, the term of this patent is extended or adjusted under 35 U.S.C. 154(b) by 408 days.

(21) Appl. No.: 17/715,239

(22) Filed: Apr. 7, 2022

(65) Prior Publication Data

US 2023/0322401 A1  Oct. 12, 2023

(51) Int. Cl.
*F01D 21/02* (2006.01)
*B64D 41/00* (2006.01)

(52) U.S. Cl.
CPC .............. *F01D 21/02* (2013.01); *B64D 41/00* (2013.01)

(58) Field of Classification Search
CPC ...... F01D 21/02; F02C 9/46; F05D 2270/021; F05D 2220/50
See application file for complete search history.

(56) References Cited

U.S. PATENT DOCUMENTS

| | | | | |
|---|---|---|---|---|
| 4,071,897 A | * | 1/1978 | Groves, Jr. | F01D 21/02 60/660 |
| 4,083,052 A | * | 4/1978 | Metcalf | G07C 5/08 324/171 |
| 4,218,879 A | * | 8/1980 | Hagrman | G01P 3/489 361/240 |
| 4,474,013 A | * | 10/1984 | Chamberlain | F01D 21/02 417/30 |
| 2008/0213084 A1 | * | 9/2008 | Rosenfield | F01D 17/06 415/30 |
| 2020/0010207 A1 | * | 1/2020 | Yakobov | G01P 3/489 |
| 2020/0223555 A1 | * | 7/2020 | Mallette | B64D 41/00 |

* cited by examiner

*Primary Examiner* — Mong-Shune Chung
(74) *Attorney, Agent, or Firm* — Hanley, Flight & Zimmerman, LLC

(57) ABSTRACT

Aircraft Auxiliary Power Unit (APU) controllers and related methods are described herein. An example APU controller includes a sensor interface to receive a signal from a speed sensor. The signal includes pulses representing a rotational speed of an engine of an APU. The APU controller also includes an overspeed detection circuit including a counter to count a number of pulses from the signal occurring within a time interval, a digital-to-analog converter (DAC) to convert the number of pulses into an analog voltage signal and a comparator to: compare the analog voltage signal to an overspeed threshold signal and generate a shutdown command in response to the analog voltage signal exceeding the overspeed threshold signal. The APU controller also includes a valve driver to, in response to receiving the shutdown command, cause a fuel shutoff valve to cease fuel flow to the engine of the APU.

19 Claims, 5 Drawing Sheets

AIRCRAFT AUXILIARY POWER UNIT (APU) CONTROLLERS AND RELATED METHODS

FIELD OF THE DISCLOSURE

This disclosure relates generally to aircraft and, more particularly, to aircraft auxiliary power unit (APU) controllers and related methods.

BACKGROUND

Aircraft, such as large commercial aircraft, often include an auxiliary power unit (APU). The APU provides additional power to one or more systems of the aircraft for purposes other than propulsion. For example, the APU can produce electrical power that can be used to illuminate the cabin and cockpit while the aircraft is on the ground and the engines are shutdown. The APU can also be used to produce pressurized air that can be used for various purposes, such as for starting the engines and/or for operating the environmental control system (ECS) while the aircraft is on the ground and the engines are shutdown. The APU is controlled by an APU controller or electronic control unit (ECU). The APU controller monitors the speed of the APU. If the APU exceeds a certain threshold speed, the APU controller shuts down the APU to prevent potential damage.

SUMMARY

Disclosed herein is an example auxiliary power unit (APU) controller for an APU of an aircraft. The APU controller includes a sensor interface to receive a signal from a speed sensor. The signal includes pulses representing a rotational speed of an engine of the APU. The APU controller also includes an overspeed detection circuit including a counter to count a number of pulses from the signal occurring within a time interval, a digital-to-analog converter (DAC) to convert the number of pulses into an analog voltage signal and a comparator to: compare the analog voltage signal to an overspeed threshold signal and generate a shutdown command in response to the analog voltage signal exceeding the overspeed threshold signal. The APU controller also includes a valve driver to, in response to receiving the shutdown command, cause a fuel shutoff valve to cease fuel flow to the engine of the APU.

An example method disclosed herein includes counting, via a counter, a number of pulses in a signal from a speed sensor during a time interval. The number of pulses representing a rotational speed of an engine of an auxiliary power unit (APU). The method also includes converting, via a digital-to-analog converter (DAC), the number of pulses into an analog voltage signal, comparing, via a comparator, the analog voltage signal to an overspeed threshold signal, and generating, via the comparator, a shutdown command in response to the analog voltage signal exceeding the overspeed threshold signal.

An example auxiliary power unit (APU) system of an aircraft disclosed herein includes an engine, a speed sensor to detect a speed of the engine, a fuel shutoff valve to control fuel flow to the engine, and an APU controller. The APU controller includes an overspeed detection circuit to determine, based on a signal from the speed sensor, whether a speed of the engine exceeds an overspeed threshold and generate a shutdown command in response to the speed of the engine exceeding the overspeed threshold. The overspeed detection circuit does not include a field programmable gate array (FPGA). The APU controller also includes a valve driver to close the fuel shutoff valve in response to receipt of the shutdown command.

Figure 1:
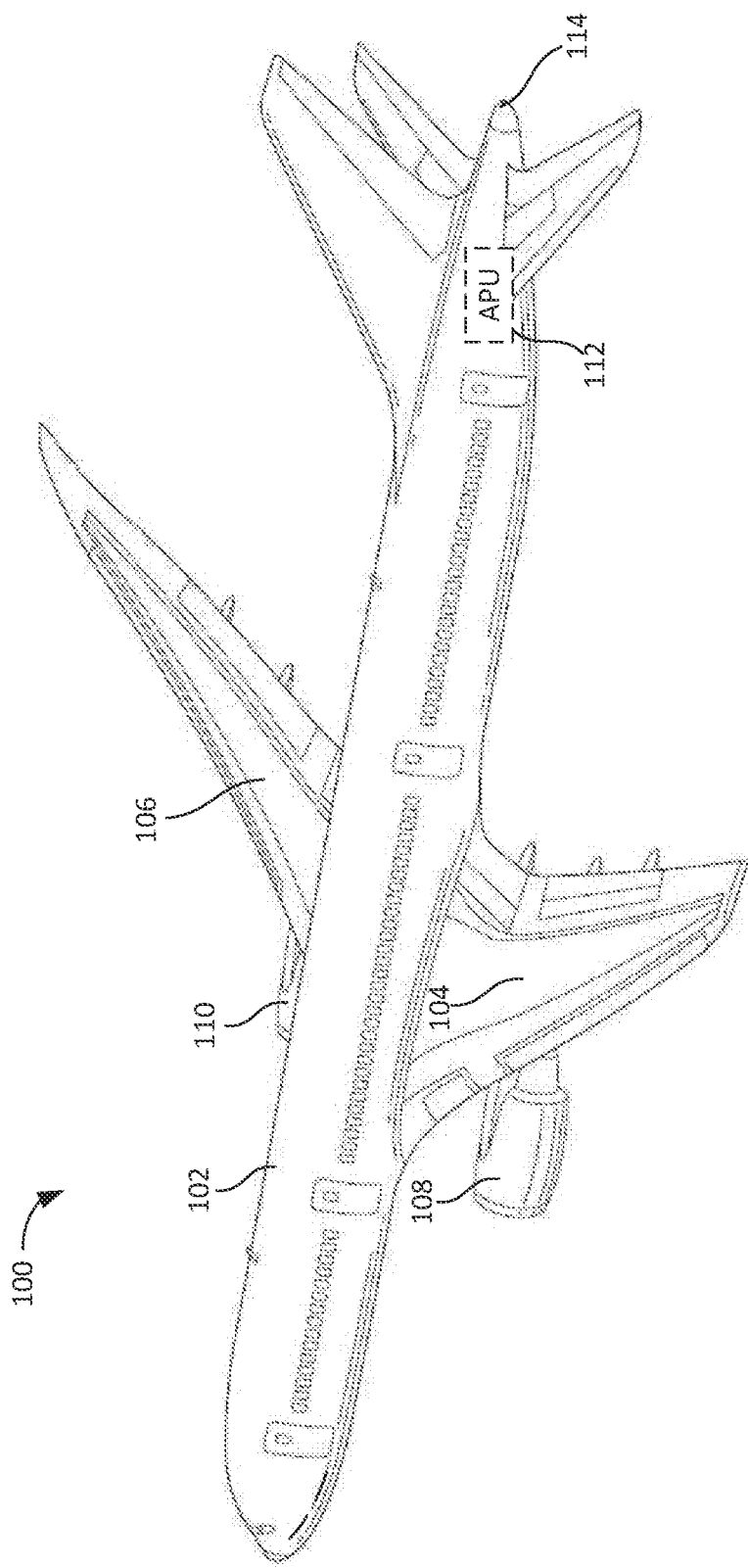
FIG. 1 illustrates an example aircraft in which examples disclosed herein can be implemented.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example auxiliary power unit (APU) controllers that utilize discrete circuit components to accurately monitor the speed of an APU engine and perform overspeed shutdown operations if the APU engine exceeds a certain overspeed threshold. The use of discrete circuit components enables a significant reduction in design complexity, which reduces or eliminates the need for complex testing certifications and reduces associated costs.

Aircraft, such as large commercial aircraft, often include an APU to provide power to various systems of the aircraft. The APU includes an engine, such as gas turbine engine, and a generator that is driven by the engine. The APU can be activated at various times to provide additional power (e.g., electrical power, hydraulic power, etc.), such as while the aircraft is on the ground with the engines shutdown. An APU system typically includes an APU controller (sometimes referred to as an APU Electronic Control Unit (ECU)), which controls and monitors all phases of the operation of the APU engine. One of the operations is the APU shutdown, which has two types: normal shutdown and protective shutdown. Protective shutdown is implemented when the APU engine reaches a certain speed limit, which may be referred to as an overspeed threshold or overspeed threshold limit.

Per the Federal Aviation Administration (FAA) and other aircraft governing bodies, overspeed detection functionality requires Design Assurance Level (DAL) A certification. This is a safety critical function used to properly shutdown the APU in the event of the speed exceeding the overspeed threshold. For the mechanically speed governed APUs, the overspeed threshold is selected at just above the maximum variation limit of the speed governor. Therefore, there is a high demand for accurate overspeed detection so that proper overspeed shutdown can occur but will not occur prematurely or incorrectly due to variations of the speed governor.

Example APU systems include one or more variable reluctance (VR) speed sensors to measure the speed of the APU engine. The VR speed sensor generates a signal that includes pulses of voltage (bi-directional). The frequency of the pulses is dependent on the speed of the rotor and number of the teeth in the gear assembly. Therefore, the number of pulses within a time period represent a rotational speed of the APU engine. Example APU controllers include a signal conditioning circuit having a frontend zero-crossing comparator followed by a frequency-to-voltage converter that converts frequency input corresponding to speed into an analog output voltage.

Some known APU controllers utilize programmable logic devices such as a microcontroller, a complex programmable logic device (CPLD), or a field programmable gate (FPGA), to initiate a protective shutdown of the APU. Accurate speed measurement can be achieved using microcontroller/CPLD/FPGA based circuits, but because the overspeed shutoff function is a DAL A safety critical functionality, these types of components require conducting DAL A DO-178/DO-254 certification to qualify the intelligence built into the microcontroller/CPLD/FPGA within the APU controller. Testing the intelligence in the microcontroller/CPLD/FPGA to satisfy the certification is complex and time consuming. Therefore, using microcontroller/CPLD/FPGA based circuits greatly increases the design complexity and leads to longer product development cycles and higher qualification costs.

Other known APU controllers utilize frequency-to-voltage (F-to-V) conversion integrated circuits (ICs). However, the transfer function of such circuits depends on a timing capacitor to convert the frequency to voltage. The variation of the timing capacitance value and internal circuit parameters over the operating temperature renders this type of design less accurate for speed measurement.

The example APU controllers and methods disclosed herein utilize discrete circuit components instead of microcontroller/CPLD/FPGA based circuits to accurately monitor the speed of the APU engine and perform overspeed shutdown functionality. In particular, example APU controllers disclosed herein include an overspeed detection circuit including discrete components such as a binary counter and a DAC that are controlled using comparator based edge circuits. The example APU controllers achieve the same or better overspeed detection accuracy but avoid using microcontroller/CPLD/FPGA based circuits. This drastically reduces the impact and costs associated with DO-254 certification compared to microcontroller/CPLD/FPGA based circuits, thereby reducing overall timing and costs. Further, the example APU controllers disclosed herein do not utilize timing capacitors as required by F-to-V conversion IC based circuits. This enables the example APU controllers to achieve high accuracy output of less than 1% of full scale over the operating range. Also, using discrete circuit components enables the APU controllers to be scalable. In particular, the APU controllers can be easily scaled for use in any high or lower speed measurement applications. Therefore, using discrete circuit components (instead of microcontroller/CPLD/FPGA based circuits) significantly reduces the design complexity, costs (e.g., non-recurring costs), and development timelines, as well as enhances the reliability score of the function.

Turning now to the figures, FIG. 1 illustrates an example aircraft 100 in which the examples disclosed herein can be implemented. The aircraft 100 includes a fuselage 102, a first wing 104 coupled to the fuselage 102, and a second wing 106 coupled to the fuselage 102. In the illustrated example, the aircraft 100 includes a first engine 108 carried by the first wing 104 and a second engine 110 carried by the second wing 106. The engines 108, 110 generate propulsive thrust to fly the aircraft 100. In other examples, the aircraft 100 may include only one engine or may include more than two engines. The engine(s) can be carried on the first and/or second wings 104, 106 and/or another structure on the aircraft 100 (e.g., on the tail section of the fuselage 102).

In the illustrated example, the aircraft 100 includes an auxiliary power unit (APU) 112. The APU 112 includes an engine that is operated during certain times to provide power (e.g., electrical power, pneumatic pressure, etc.) to one or more systems of the aircraft 100. In some examples, the APU 112 is used when the engines 108, 110 are not operating at high enough speed to power to the systems of the aircraft 100. For example, while the aircraft 100 is on the ground (with the engines 108, 110 off or idling), the APU 112 can be used to produce electrical power for powering various systems (e.g., electrical or lightings systems in the cockpit, the cabin, etc.) of the aircraft 100. The APU 112 can also produce pressurized air (e.g., bleed air) for use by one or more systems of the aircraft 100. For example, the APU 112 can produce pressurized air for starting the engines 108, 110. The pressurized air can also be used for running the Environmental Controls System (ECS) (which pressurizes the cabin and regulates the temperature of the air in the cabin) when the aircraft 100 is on the ground. Additionally, the APU 112 can be activated during flight to provide backup power to the one or more systems if additional electrical and/or hydraulic power is desired. In some examples, the APU 112 is located in the aft section of the fuselage 102. The APU 112 can include a gas engine that vents exhaust from a tail tip 114 of the fuselage 102.

Figure 2:
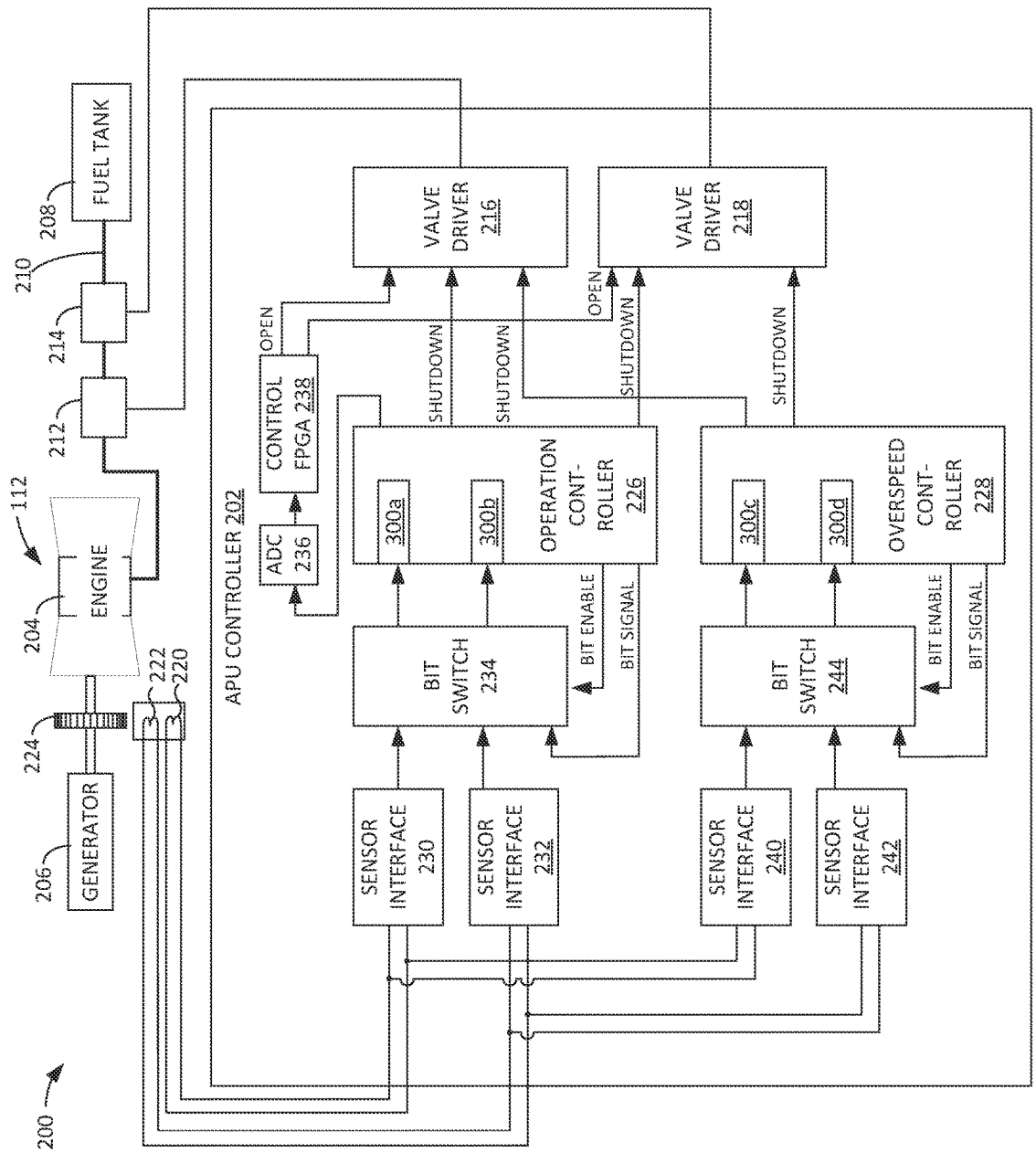
FIG. 2 is a block diagram of an example auxiliary power unit (APU) system that can be implemented on the example aircraft of FIG. 1 and that includes an example APU and an example APU controller for controlling the example APU.

FIG. 2 is a bock diagram of an example APU system 200 that may be implemented on the example aircraft 100 of FIG. 1. The example APU system 200 includes the example APU 112 and an example APU controller 202 that controls the various operations of the APU 112, including start-up, speed control, and shutdown. In the illustrated example, the APU 112 includes an engine 204. In this example, the engine 204 is a gas turbine engine. In other examples, the engine 204 can be implemented as another type of engine (e.g., a reciprocating internal combustion engine, a rotary engine, etc.). In this example, the APU 112 includes a generator 206 that is powered by the engine 204. The generator 206 produces electrical power that can be used to power one or more systems of the aircraft 100. In some examples, bleed air can be extracted from the engine 204 to provide pressured air to one or more systems of the aircraft 100 (e.g., for starting the engines 108, 110). Therefore, the APU 112 can provide power (e.g., electrical power, pneumatic power, etc.) to various systems of the aircraft 100.

The APU system 200 includes a fuel tank 208 that contains fuel for operating the engine 204. The APU system 200 includes a fuel line 210 between the fuel tank 208 and the engine 204 (e.g., the combustor section of the engine). In the illustrated example, the APU system 200 includes a fuel shutoff valve 212 coupled to the fuel line 210. The fuel shutoff valve 212 controls fuel flow to the engine 202. In particular, the fuel shutoff valve 212 can be opened during normal operation to allow fuel to the engine 204, and can be closed to stop fuel flow to the engine 204 to cause a shutdown. In the illustrated example, the APU system 200 also includes a fuel metering valve 214 (e.g., a solenoid valve). The fuel metering valve 214 controls the rate of fuel flow to the engine 204. For example, the fuel metering valve 214 can increase or decrease fuel flow to the engine 204 to increase or decrease the speed of the engine 204.

The example APU controller 202 controls and monitors the various phases of operation of the engine 204, including shutdown. A shutdown can occur during a normal shutdown (e.g., as commanded by the pilot) or protective shutdown. Protective shutdown occurs when the speed of the engine 204 reaches an overspeed threshold, which prevents potential damage to the APU 112 and/or the aircraft 100. In the event of a shutdown, the APU controller 202 closes the fuel shutoff valve 212, which shuts down the engine 204. Additionally, during a shutdown event, the APU controller 202 may close or deactivate the fuel metering valve 214. In the illustrated example, the APU controller 202 includes a first valve driver 216 that controls the fuel shutoff valve 212 and a second valve driver 218 that controls the fuel metering valve 214. Based on the detected speed of the engine 204 and/or one or more other parameters, the APU controller 202 uses the first and second valve drivers 216, 218 to control the valves 212, 214 and thereby control the operation of the engine 204.

In some examples, the engine 204 includes a mechanical governor. The overspeed threshold may be set at just higher than the limit speed of the mechanical governor. Therefore, if the mechanical governor fails, the APU controller 202 can shutdown the engine 204. In some examples, the overspeed threshold is set to certain percentage of the nominal operating speed of the engine 204 to prevent potential damage. For example, if the nominal operating speed of the engine 204 is 12,000 RPM, the APU controller 202 may generally control the engine 204 to operate at 95% to 106% of the nominal operating speed. In such an example, the overspeed threshold may be set at 107% (12,840 RPM) of the nominal speed. If the engine 204 reaches this overspeed threshold, the APU controller 202 closes the fuel shutoff valve 212 (and, in some examples, the fuel metering valve 214) to shutdown the engine 204.

To measure the speed of the engine 204, the APU system 200 can include one or more speed sensors. In the illustrated example of FIG. 2, the APU 112 includes a includes a first speed sensor 220 and a second speed sensor 222. In this example, the first and second speed sensors are variable reluctance (VR) speed sensors, referred to herein as the first VR speed sensor 220 and the second VR speed sensor 222. The APU 112 also includes a gear 224 driven by an output of the engine 204. For example, the gear 224 can be coupled to an output shaft of the engine 204 or gear assembly driven by the engine 204. The first and second VR speed sensors 220, 222 measure the speed of the gear 224, which can be used to determine the speed of the rotor of the engine 204. In particular, the first VR speed sensor 220 outputs a signal that includes voltage pulses (bi-directional) generated by the teeth of the gear 224 as the teeth are rotated by the first VR speed sensor 220. The second VR speed sensor 222 similarly outputs a signal including pulses. The number of pulses within a time interval can be used to determine the speed of the engine 204. Therefore, the pulses represent a rotational speed of the engine 204. Assume for example, the nominal speed of the engine 204 is 12,000 RPM, and the gear 224 has 10 teeth, therefore the number of pulses per second is 2000 during nominal speed of the engine 204. If the overspeed threshold is 107%, this equates to 2140 pulses per second. Therefore, if the APU controller 202 detects more than 2140 pulses per second, the APU controller 202 initiates a shutdown. In some examples, the APU controller 202 determines the number of pulses within a specific time interval corresponding to a specific update frequency, such as 4 Hertz (Hz). In such an example, the overspeed threshold is 2140/4=515 pulses per interval. In some examples, the APU controller 202 provides continuous monitoring of APU speed, a speed resolution of 0.5% of full scale RPM, an update rate of 250 ms, and speed detection accuracy of less than 1%. In this example, the APU 112 utilizes two VR speed sensors for reliability, accuracy, and safety. In some examples, the first and second VR speed sensors 220, 222 are disposed in different locations around the gear 224. However, in other examples, the APU 112 can utilize only one speed sensor or more than two speed sensors. Further, in other examples, the APU system 200 can utilize other types of speed sensors (e.g., a Hall effect sensor).

In the illustrated example, the APU controller 202 includes an example operation controller 226 and an example overspeed controller 228. The operation controller 226 controls the general operation of the APU 112, including start-up, increasing or decreasing the speed of the engine 204, and shutdown of the engine 204 (e.g., both normal and protective shutdown). The overspeed controller 228 also provides protective shutdown during an overspeed event. The operation controller 226 and the overspeed controller 228 receive and analyze the signals from the first and second VR speed sensors 220, 222 in parallel to determine the speed of the engine 204. Based on the detected speeds and/or one or more other parameters, the operation controller 226 provides open or shutoff commands to the first and second valve drivers 216, 218. The overspeed controller 228 provides shutoff commands to the first and second valve drivers 216, 218 in the event that overspeed is detected. The operation controller 226 and the overspeed controller 228 are implemented by discrete circuit components instead of an FPGA, CPLD, or microcontroller as in known designs. This reduces complex testing requirements for DO-254 certifications compared to microcontroller/FPGA/CPLD based circuits. This significantly reduces costs and time associated with manufacture of the APU controller 202. Examples of the discrete circuit components of the operation controller 226 and the overspeed controller 228 are disclosed in further detail herein.

In the illustrated example, the APU controller 202 includes a first sensor interface 230 (e.g., a zero crossing detector/sensor conditioning interface) that receives a signal from the first VR speed sensor 220 and a second sensor interface 232 that receives a signal from the second VR speed sensor 222. In some examples, the APU controller 202 includes a first built-in-test (BIT) switch 234 that can be used during power-up and restart to verify the circuitry is operating correctly. The BIT switch 234 can be activated by BIT enable and BIT signal from the operation controller 226. Otherwise, during normal operation, the signals from the first and second VR speed sensors 220, 222 are passed to the operation controller 226.

The operation controller 262 determines, based on the signals from the first and second VR speed sensors 220, 222, the speed of the engine 204 and compares the speed to an overspeed threshold. Based on the comparison, the operation controller 226 determines whether to open or close the valves 212, 214. The operation controller 226 can generate open or shutoff commands for the first and second valve drivers 216, 218 based on the comparison. In the illustrated example, the APU controller 202 includes an analog-to-digital converter (ADC) 236 and a control FPGA 238. If the operation controller 226 determines the speed of the engine 204 is below the overspeed threshold, the ADC 236 and the control FPGA 238 generate an open command for the valve drivers 216, 218, which cause the valves 212, 214 to remain open (or change position to increase or decrease the speed of the engine 204). The ADC input to the FPGA 238 can also govern the fuel metering valve 214, thereby controlling and monitoring the speed of the engine 204. However, if the operation controller 226 determines the speed exceeds the overspeed threshold, the operation controller 226 generates shutdown commands, which cause the valves 212, 214 to close to shutdown the engine 204.

Similarly, the APU controller 202 includes a third sensor interface 240 that receives the signal from the first VR speed sensor 220 and a fourth sensor interface 242 that receives the signal from the second VR speed sensor 222. The APU controller 202 includes a second BIT switch 244 used during power-up or restart. The signals are passed to the overspeed controller 228. The overspeed controller 228 determines, based on the signals from the first and second VR speed sensors 220, 222, the speed of the engine 204 and compares the speed to an overspeed threshold. If the speed meets or exceeds the overspeed threshold, the overspeed controller 228 issues shutoff commands to the first and second valve drivers 216, 218, which close the valves 212, 214 to shutoff fuel the engine 204 for shutdown.

In the illustrated example, the APU controller 202 includes an example overspeed detection circuit 300. The example overspeed detection circuit 300 determines the speed of the engine 204 based on a signal from a speed sensor and compares the speed to the overspeed threshold for shutdown functionality. The overspeed detection circuit 300 does not include any microcontrollers, CPLDS, or FPGAs. Instead, the overspeed detection circuit 300 includes discrete circuit components that determine the speed of the engine and compare the speed to the overspeed threshold. The discrete circuit components of the overspeed detection circuit 300 are disclosed in further detail in conjunction with FIG. 3.

In the illustrated example, the APU controller 202 includes multiple instances of the overspeed detection circuit 300. In other words, multiple instances of the overspeed detection circuit 300 are implemented in the APU controller 202. This provides a high level of reliability, redundancy, and safety for overspeed detection operations. In the illustrated example, the operation controller 226 includes a first overspeed detection circuit 300a and a second overspeed detection circuit 300b, and the overspeed controller 228 includes a third overspeed detection circuit 300c and a fourth overspeed detection circuit 300d. The first overspeed detection circuit 300a determines the speed of the engine 204 as detected by the first VR speed sensor 220 and compares the speed to the overspeed threshold. The second overspeed detection circuit 300b determines the speed of the engine 204 as detected by the second VR speed sensor 222 and compares the speed to the overspeed threshold. If both circuits 300a, 300b determine the speed has exceeded the overspeed threshold, the operation controller 226 generates shutdown commands for the valve drivers 216, 218. Similarly, the third overspeed detection circuit 300c determines the speed of the engine 204 as detected by the first VR speed sensor 220 and compares the speed to the overspeed threshold, and the fourth overspeed detection circuit 300b determines the speed of the engine 204 as detected by the second VR speed sensor 222 and compares the speed to the overspeed threshold. If both circuits 300c, 300d determine the speed has exceeded the overspeed threshold, the operation controller 226 generates shutdown commands for the valve drivers 216, 218. In some examples, the valve drivers 216, 218 only close the valves 212, 214 if shutdown commands are received from both the operation controller 226 and the overspeed controller 228. In other words, a shutdown only occurs if all four overspeed detection circuits 300a-300d detect the engine 204 operating above the overspeed threshold. This creates a high level of redundancy for accurate speed detection and reliability and prevents or reduces the possibility of incorrectly shutting down the engine 204 due to false speed measurement. While in this example the APU controller 202 includes four overspeed detection circuits 300a-300d, in other examples, the APU controller 202 can include more or fewer units of the overspeed detection circuit 300. For example, in some examples, the APU controller 202 includes only one unit of the overspeed detection circuit 300.

Figure 3:
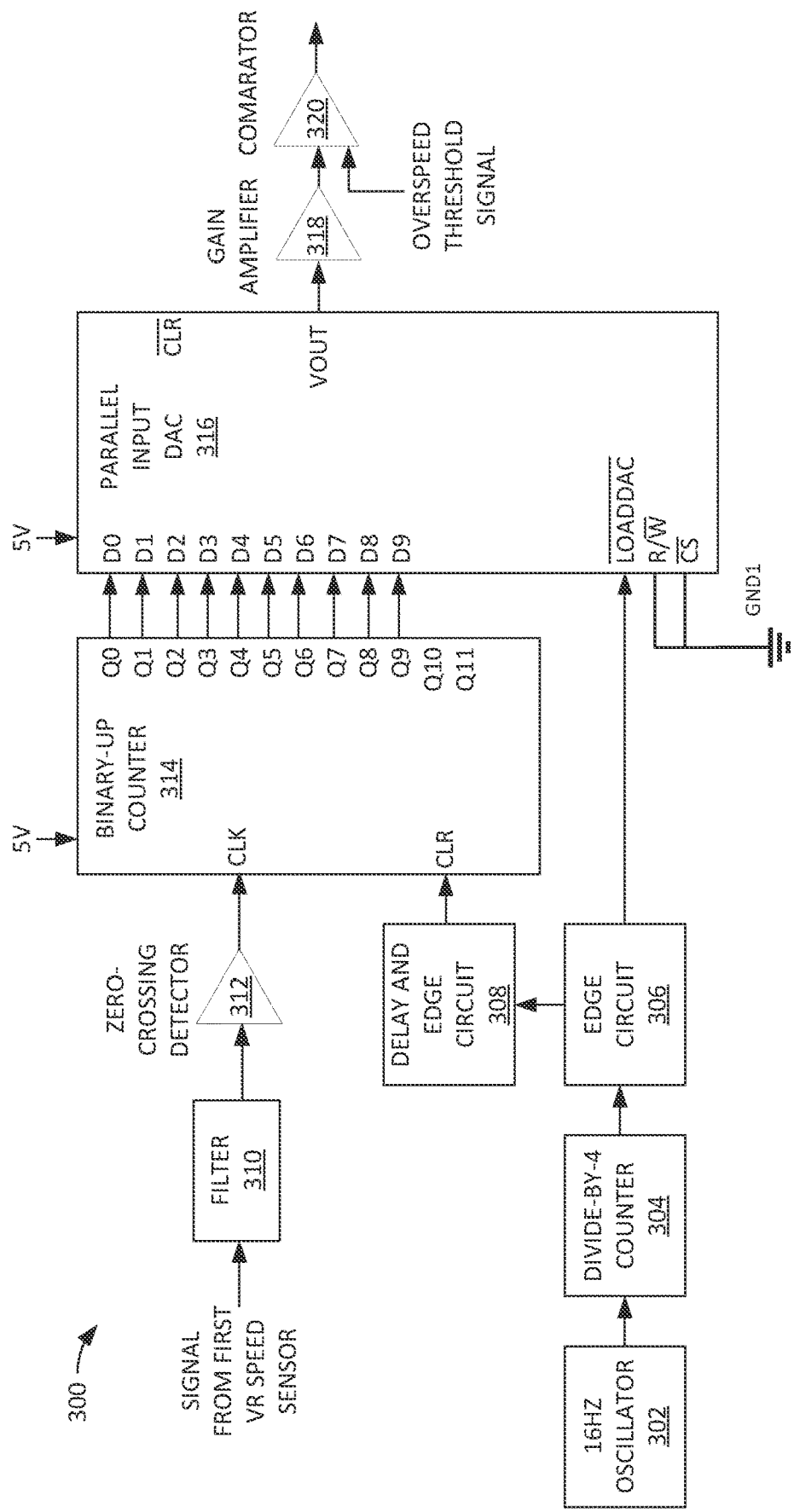
FIG. 3 is a circuit diagram of example overspeed detection circuit that can be implemented in the example APU controller of FIG. 2.

FIG. 3 is a circuit diagram of the example overspeed detection circuit 300. As disclosed above, the overspeed detection circuit 300 of FIG. 3 is implemented twice in the operation controller 226 and twice in the overspeed controller 228. Therefore, the overspeed detection circuit 300 is implemented four times in the APU controller 202. This ensures a high level of reliability when detecting an overspeed event and prevents or reduces the possibility of pre-maturely shutting down the engine 204.

To avoid redundancy, the example overspeed detection circuit 300 is only described once in connection with the third overspeed detection circuit 300c that analyzes the signal from the first VR speed sensor 220 in the overspeed controller 228. However, it is understood that three other instances of the circuits 300a, 300b, 300d are similarly implemented in the APU controller 202. Therefore, any of the example aspects disclosed in connection with the overspeed detection circuit 300 for analyzing the signals from the first VR speed sensor 220 in the overspeed controller 228 can likewise apply to the other versions of the circuits 300a, 300b, 300d.

As disclosed above, the signal from the first VR speed sensor 220 includes voltage pulses. The pulses are generated as the teeth on the gear 224 pass the first VR speed sensor 220. Therefore, the number of pulses occurring within a certain time can be used to determine the rotational speed of the engine 204. The example overspeed detection circuit 300 measures or determines the number pulses within a specific interval of time. In this example, the interval is 250 ms. In some examples, the interval is selected such that the number of pulses within the interval is sufficient to provide a measurement resolution of 0.5%. To create the time interval, the overspeed detection circuit 300 generates timing signals at a pre-determined frequency. In the illustrated example, the overspeed detection circuit 300 includes an oscillator 302 and a counter 304 (referred to herein as the divide-by counter 304) that generate the timing signals at the pre-determined frequency. In this example, the oscillator 302 operates at 16 Hz and, thus, generates timing signals at a frequency of 16 Hz. The divide-by counter 304 divides the 16 hz timing signals. In this example, the divide-by counter 304 divides the 16 hz timing signals by 4, and, thus, reduces the timing signals to a frequency of 4 Hz. Therefore, every 250 ms (four times a second) a timing signal is output by the divide-by-4 counter 304. In some examples, the use of the oscillator 302 and the divide-by counter 304 enables the system to easily change to other frequencies.

In the illustrated example, the overspeed detection circuit 300 includes an edge circuit 306. The edge circuit 306 triggers or outputs an impulse signal whenever there is a logic-low to logic-high transition in the divide-by counter 304. In other words, the edge circuit 306 converts the timing signals into impulse signals (e.g., short low-to-high or high-to-low signals). Therefore, in this example, the edge circuit 306 outputs an impulse signal every 250 ms in accordance with the 4 Hz timing signals. In some examples, the impulse signals are negative impulse signals. The edge circuit 306 transmits or propagates the impulse signals to a counter 314, referred to herein as the binary-up counter 314, and a DAC 316, referred to herein as the parallel input DAC 316, disclosed in further detail herein. The overspeed detection circuit 300 includes a delay and edge circuit 308 that delays and inverts the impulse signals (e.g., changes to a positive impulse signal) to the binary-up counter 314 relative to the parallel input DAC 316.

In the illustrated example, the overspeed detection circuit 300 includes a filter 310 that receives the signal from the first VR speed sensor 220 (e.g., as passed through the second BIT switch 234 (FIG. 2)). The filter 310 filters interference and noise coupled from nearby signals on the sensor lines, while allowing intended frequencies to pass through. The overspeed detection circuit 300 includes a zero-crossing detector 312 that detects each time the voltage in the signal from the first VR speed sensor 220 crosses zero, thereby detecting each pulse. The zero-crossing detector 312 converts the signal from the first VR speed sensor 220 into a digital signal.

In the illustrated example, the binary-up counter 314 counts each time a pulse is received from the zero-crossing detector 312. In particular, the binary-up counter 314 counts or increments the number of pulses from the signal occurring within a time interval (e.g., since the last time the binary-up counter 314 was cleared). In the illustrated example, the binary-up-counter 314 has inputs/outputs Q0-Q9, which equates to 10 bits. Therefore, the binary-up counter 314 can count up to $2^{10}$=1024 pulse counts. Thus, in this example, the binary-up counter 314 is a 1024-bit counter. The outputs Q0-Q9 are connected to corresponding inputs D0-D9 of the parallel input DAC 316.

The parallel input DAC 316 receives an impulse signal (e.g., a negative impulse signal) from the edge circuit 306 every 250 ms at a LOADDAC input. When the parallel input DAC 316 receives one of the impulse signals at the LOADDAC, the parallel input DAC 316 loads or reads the number of pulses from the outputs Q0-Q9 of the binary-up counter 314 and converts the number of pulses into an analog voltage signal. In other words, the parallel input DAC 316 converts the number of pulses from the last time interval into the analog voltage signal. The analog voltage signal is proportional to the number of pulses. In some examples the analog voltage signal remains unchanged until the next interval occurs, which may cause the analog voltage signal to increase, decrease or remain the same.

The binary-up counter 314 also receives an impulse signal (e.g., a positive impulse signal) from the delay and edge circuit 308 every 250 ms at a clear (CLR) input. Each time the binary-up counter 314 receives one of the impulse signals, the binary-up counter 314 clears the current pulse count and starts over with zero. The delay and edge circuit 308 delays the impulse signal received at the CLR input of the binary-up counter 314 relative to the impulse signal received at the LOADDAC input of the parallel input DAC 316. This enables the parallel input DAC 316 to load the current number of pulses immediately before the binary-up counter 314 is cleared to start the next interval.

Figure 4:
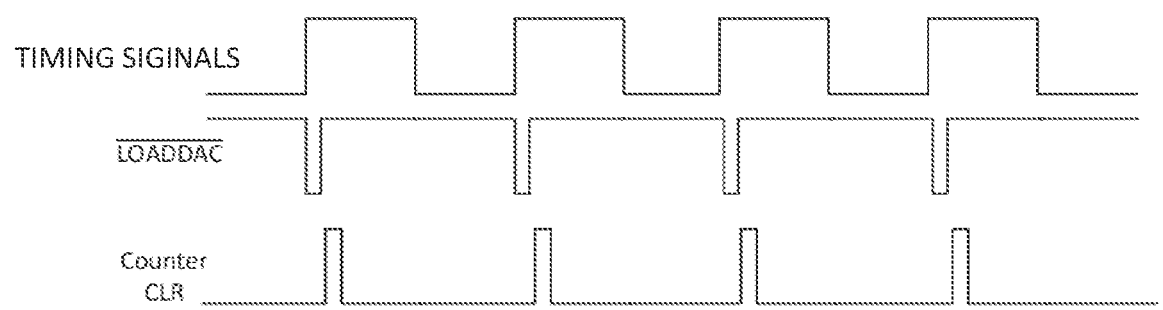
FIG. 4 shows example signals from different connection points in the example overspeed detection circuit of FIG. 3.

FIG. 4 shows the timing signals output from the oscillator 302 and the divide-by counter 304, the impulse signals received at the LOADDAC input of the parallel input DAC 316, and the impulse signals received at the CLR of the binary-up counter 314. The edge circuit 306 converts the timing signals from the oscillator 302 and the divide-by counter 304 to the impulse signals shown in the LOADDAC input, which are short high-to-low signals. Further, the delay and edge circuit 308 delays and inverts the impulse signals to the binary-up counter 314. Therefore, as shown in FIG. 4, the counter CLR signal is slightly delayed compared to the LOADDAC signal. This enables the parallel input DAC 316 to load and convert the number of pulses before the number of pulses are cleared at the binary-up counter 314. Therefore, every 250 ms, the binary-up counter 314 counts the number of pulses since the last clear, the parallel input DAC 316 loads and converts the current number of pulses from the binary-up counter 314 into the analog voltage signal, and then the binary-up counter 314 is cleared so that the process can begin again in the next interval.

Referring back to FIG. 3, the parallel input DAC 316 outputs the analog voltage signal at VOUT. The analog voltage signal represents the number of pulses occurring within one timing interval. Every time the parallel input DAC 316 receives an impulse signal, the parallel input DAC 316 updates the analog voltage signal based on the number of pulses from the last interval. Thus, the analog voltage signal is indicative of the speed of the engine 204 as detected by the first VR speed sensor 220. In the illustrated example, the overspeed detection circuit 300 includes a gain amplifier 318 that amplifies the analog voltage signal. In some examples, the gain amplifier 318 is a 1.6× gain amplifier. In other examples, the gain amplifier 318 can use a higher or lower gain.

In the illustrated example, the circuit 300 includes a comparator 320. The comparator 322 compares the analog voltage signal to an overspeed threshold signal, which represents or corresponds to the overspeed threshold (e.g., 107% of the nominal speed or 535 pulses per interval). In response to the analog voltage signal exceeding the overspeed threshold signal, the comparator 320 generates a shutdown command that is transmitted to the first and second valve drivers 216, 218 (FIG. 2). Otherwise, if the analog voltage signal does not exceed the overspeed threshold signal, no shutdown command is issued, and the engine 204 may continue to operate as normal. In some examples, the comparator 320 has an output that is passed to the valve driver(s) 216, 218, and that output is latched when the analog voltage signal exceeds the overspeed threshold signal. The latching of the output is indicative of the overspeed detection. In response to the shutdown command (e.g., the latching), the first valve driver 216 causes the fuel shutoff valve 212 to cease fuel flow to the engine 204 of the APU 112. Additionally, in some examples, the second valve driver 218 also causes the fuel metering valve 214 to close or deactivate.

As disclosed above, the example overspeed detection circuit 300 does not include any microcontrollers, CPLDs, or FPGAs. This reduces complex testing for DAL A DO-254 certification associated with such components, thereby reducing time and costs associated with the APU controller 202. However, the example overspeed detection circuit 300 still provides the same or better speed detection accuracy as the microcontroller/CPLD/FPGA based circuits.

In some examples, the first valve driver 216 only closes the fuel shutoff valve 212 to shutdown the engine 204 when all of the overspeed detection circuits 300a-300d issue a shutoff command. Therefore, both overspeed detection circuits 300a, 300b in the operation controller 226 and both overspeed detection circuits 300c, 300d in the overspeed controller 228 must detect their analog voltage signals as exceeding the overspeed threshold signal before a shutdown occurs. This redundancy ensures the engine 204 is actually operating at a high speed and should be shutdown, thereby improving reliability. However, in other examples, the first valve driver 216 may be configured to close the fuel shutoff valve 212 if less than all of the overspeed detection circuits 300a-300d detect overspeed, such as 3 out of 4 or 2 out of 4. In other examples, as disclosed above, only one overspeed detection circuit 300 may be implemented in the APU controller 202. In such an example, the first valve driver 216 closes the fuel shutoff valve 212 in response to a shutdown command from the single overspeed detection circuit 300.

Referring to FIG. 3, the parallel input DAC 316 depicts a Read/Write (R/W) input and a Chip Select (CS) input. The R/W input can receive a control signal that causes the parallel input DAC 316 to enter a Read/Write mode. The CS input can receive a control signal for activating the parallel input DAC 316 at a specific time it is intended to operate. In some examples, the CS and R/W inputs are not controlled or used, and instead the APU controller 202 is always configured to be in active/write mode.

The example APU controller 202 and the example overspeed detection circuit 300 are scalable depending on the desired speed range detection and resolution. For example, the oscillator 302 and/or the divide-by counter 304 can be configured to generate timing signals at a higher or lower frequency, thereby increasing or decreasing the time interval. Further, the binary-up counter 314 can be configured for higher or lower counts. Therefore, the example APU controller 202 and/or the example overspeed detection circuit 300 can be used in other applications such as with vehicle engines, alternators, hydraulic pumps, etc. for speed monitoring and/or overspeed shutdown.

Figure 5:
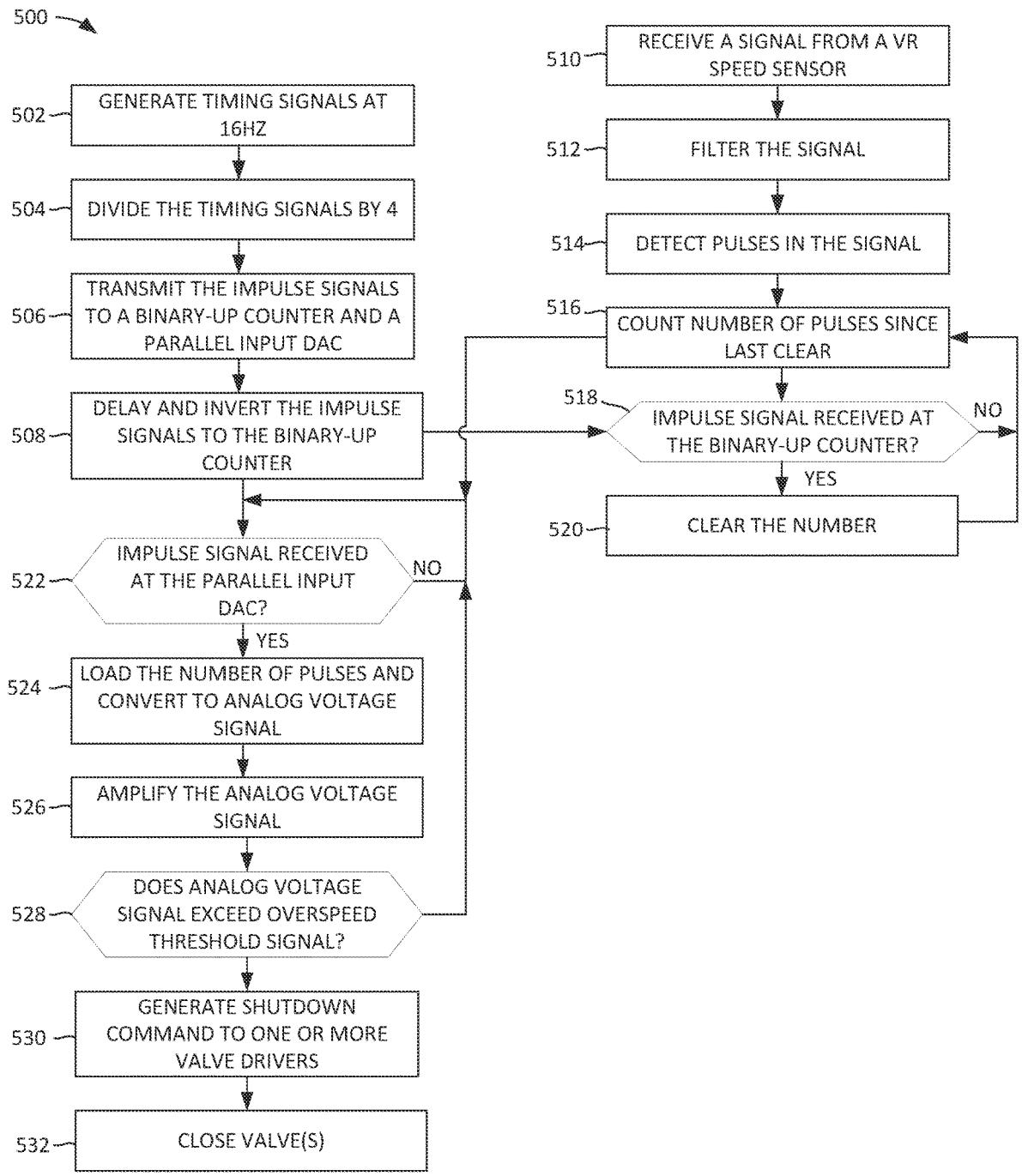
FIG. 5 is a flowchart representative of an example method of operations performed by example components of the example APU controller of FIG. 2.

FIG. 5 is a flowchart representative of an example method 500 of operations performed by the components of the APU controller 202 to perform overspeed detection. The example method 500 is disclosed in connection with the overspeed detection circuit 300c of the overspeed controller 228. It is understood the example method 500 can be similarly performed by the other overspeed detection circuits 300a, 300b, 300d. At block 502, the oscillator 302 generates timing signals at a frequency of 16 hz. At block 504, the divide-by-4 counter 304 divides the timing signals into 4, thereby converting the 16 Hz timing signals into 4 Hz timing signals. The edge circuit 306 triggers or outputs an impulse signal when a timing signal is received. Therefore, the edge circuit 306 outputs impulse signals at 4 Hz. At block 506, the edge circuit 306 transmits or propagates the 4 hz impulse signals to the binary-up counter 314 and the parallel input DAC 316. At block 508, the delay and edge circuit 308 delays and inverts the impulse signals transmitted to the binary-up counter 314 relative to the parallel input DAC 316. Blocks 502-508 are repeated continuously.

At block 510, the third sensor interface 240 receives the signal from the first VR speed sensor 220. The third sensor interface 240 passes the signal to the overspeed detection circuit 300c implemented in the overspeed controller 228. At block 512, the filter 310 filters the signal. At block 514, the zero-crossing detector 312 detects the pulses in the signal by detecting each time the voltage in the signal crosses zero. At block 516, the binary-up counter 314 counts the number of pulses since the last clear, i.e., from the start of the last interval. At block 518, the binary-up counter 314 waits for an impulse signal. As disclosed above, the impulse signals are received at a frequency of 4 hz, or every 250 ms. If an impulse signal has not been received, the binary-up counter 314 continues to count or increment the number of pulses since the last clear. If an impulse signal is received, the binary-up counter 314 clears the current number of pulses and the binary-up counter 314 starts the count over.

At block 522, the parallel input DAC 316 waits for an impulse signal. As disclosed above, the impulse signals are received at a frequency of 4 hz, or every 250 ms. If an impulse signal has not been received, the parallel input DAC 316 continues to wait. If an impulse signal is received, the parallel input DAC 316, at block 524, loads the current number of pulses from the binary-up counter 314 and converts the count into the analog voltage signal. At block 526, the gain amplifier 318 amplifies the analog voltage signal. At block 528, the comparator 320 compares the analog voltage signal to the overspeed threshold signal. If the comparator 320 determines the analog voltage signal does not exceed the overspeed threshold signal, control proceeds back to block 522 and the parallel input DAC 316 waits for the next impulse signal to convert the next interval of pulses into the analog voltage signal. If the comparator 320 determines the analog voltage signal exceeds the overspeed threshold signal, the comparator 320 generates a shutdown command that is transmitted to the first and second valve drivers 216, 218. At block 532, the first valve driver 216 closes the fuel shutoff valve 212, which shutdowns the APU 112. Additionally, the second valve driver 218 can close or deactivate the fuel metering valve 214. As disclosed above, in some examples, the valve drivers 216, 218 only close the valves 212, 214 if all four overspeed detection circuits 300a-300d detect overspeed.

While an example manner of implementing the APU controller 202 and the overspeed detection circuit 300 is illustrated in FIGS. 2 and 3, one or more of the elements, processes, and/or devices illustrated in FIGS. 2 and 3 may be combined, divided, re-arranged, omitted, eliminated, and/or implemented in any other way. Further still, the example APU controller 202 and the overspeed detection circuit 300 in FIGS. 2 and 3 may include one or more elements, processes, and/or devices in addition to, or instead of, those illustrated in FIGS. 2 and 3, and/or may include more than one of any or all of the illustrated elements, processes and devices. Further, although the example method 500 is described with reference to the example APU controller 202 with the example overspeed detection circuit 300, many other methods of implementing the example method 500 may alternatively be used. For example, the order of execution of the blocks may be changed, and/or some of the blocks described may be changed, eliminated, or combined.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide accurate speed measurement on par with microcontroller/CPLD/FPGA based solutions but with use of discrete components, thereby simplifying the design and discounting need for DO-254 certification for the overspeed functionality. This reduces labor and manufacturing costs and time. The example circuitry disclosed herein produces a highly accurate result of less than 1% of full scale over the operating range with reduced design complexity. Further, the example circuitry disclosed herein is scalable. In particular, with the use of discrete components, the example techniques can be scaled for use with higher or lower speed measurement applications, such as with a vehicle engine, an alternator, etc.

Examples APUs and related methods have been disclosed herein. Examples and example combinations include the following:

Example 1 is an auxiliary power unit (APU) controller for an APU of an aircraft. The APU controller includes a sensor interface to receive a signal from a speed sensor. The signal includes pulses representing a rotational speed of an output of an engine of the APU. The APU also includes an overspeed detection circuit including: a counter to count a number of pulses from the signal occurring within a time interval; a digital-to-analog converter (DAC) to convert the number of pulses into an analog voltage signal; and a comparator to: compare the analog voltage signal to an overspeed threshold signal; and generate a shutdown command in response to the analog voltage signal exceeding the overspeed threshold signal; and a valve driver to, in response to receiving the shutdown command, cause a fuel shutoff valve to cease fuel flow to the engine of the APU.

Example 2 includes the APU controller of Example 1, wherein the counter is a first counter, and wherein the overspeed detection circuit includes an oscillator and a second counter to generate timing signals at a pre-determined frequency.

Example 3 includes the APU controller of Example 2, wherein the pre-determined frequency is 4 Hertz (Hz).

Example 4 includes the APU controller of Example 3, wherein the first counter is a 1024-bit counter.

Example 5 includes the APU controller of any of Examples 2-4, wherein the overspeed detection circuit includes an edge circuit to convert the timing signals to impulse signals and transmit the impulse signals to the first counter and the DAC.

Example 6 includes the APU controller of Example 5, wherein the DAC is to convert the number of pulses into the analog voltage signal in response to receipt of one of the impulse signals.

Example 7 includes the APU controller of Examples 5 or 6, wherein the first counter is to clear the number of pulses in response to receipt of one of the impulse signals.

Example 8 includes the APU controller of any of Examples 5-7, wherein the overspeed detection circuit includes a delay and edge circuit that delays the impulse signals received at the first counter relative to the impulse signals received at the DAC, such that the number of pulses is converted into the analog voltage signal before the number of pulses is cleared from the first counter.

Example 9 includes the APU controller of any of Examples 1-8, wherein the overspeed detection circuit includes a zero-crossing detector to convert the signal from the speed sensor into a digital signal.

Example 10 includes the APU controller of any of Examples 1-9, wherein the overspeed detection circuit does not include a field programmable gate array (FPGA).

Example 11 is a method including counting, via a counter, a number of pulses in a signal from a speed sensor during a time interval, the number of pulses representing a rotational speed of an engine of an auxiliary power unit (APU), converting, via a digital-to-analog converter (DAC), the number of pulses into an analog voltage signal, comparing, via a comparator, the analog voltage signal to an overspeed threshold signal, and generating, via the comparator, a shutdown command in response to the analog voltage signal exceeding the overspeed threshold signal.

Example 12 includes the method of Example 11, wherein the analog voltage signal is proportional to the number of pulses.

Example 13 includes the method of Examples 11 or 12, wherein the counter is a binary-up counter, further including: generating, via an oscillator and a divide-by counter, timing signals at a pre-determined frequency; converting, via an edge circuit, the timing signals into impulse signals; and propagating, via the edge circuit, the impulse signals to the binary-up counter and the DAC.

Example 14 includes the method of Example 13, wherein the converting of the number of pulses into the analog voltage signal is in response to receipt of one of the impulse signals.

Example 15 includes the method of Example 14, further including clearing, via the first counter, the number of pulses in response to receipt of one of the impulse signals.

Example 16 includes the method of Example 15, further including delaying, with a delay and edge circuit, the impulse signals received by the counter relative to the impulse signals received by the DAC.

Example 17 includes the method of any of Examples 11-16, further including closing, via a valve driver, a fuel shutoff valve of the APU in response to receipt of the shutdown command.

Example 18 is an auxiliary power unit (APU) system of an aircraft. The APU system includes an engine, a speed sensor to detect a speed of the engine, a fuel shutoff valve to control fuel flow to the engine, and an APU controller including an overspeed detection circuit to: determine, based on a signal from the speed sensor, whether a speed of the engine exceeds an overspeed threshold; and generate a shutdown command in response to the speed of the engine exceeding the overspeed threshold, the overspeed detection circuit not including a field programmable gate array (FPGA). The APU system also includes a valve driver to close the fuel shutoff valve in response to receipt of the shutdown command.

Example 19 includes the APU system of Example 18, wherein the overspeed detection circuit includes: a digital-to-analog converter (DAC) to convert a number of pulses in a signal from the speed sensor during a time interval into an analog voltage signal; and a comparator to compare the analog voltage signal to an overspeed threshold signal corresponding to the overspeed threshold.

Example 20 includes the APU system of Example 19, wherein the comparator is to generate the shutdown command in response to the analog voltage signal exceeding the overspeed threshold signal.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An auxiliary power unit (APU) controller for an APU of an aircraft, the APU controller comprising:
   a sensor interface to receive a signal from a speed sensor, the signal including pulses representing a rotational speed of an output of an engine of the APU;
   an overspeed detection circuit including:
      a first counter to count a number of pulses from the signal occurring within a time interval;
      an oscillator and a second counter to generate timing signals at a pre-determined frequency;
      an edge circuit to convert the timing signals to impulse signals and transmit the impulse signals to the first counter and a digital-to-analog converter (DAC);
      the DAC to convert the number of pulses into an analog voltage signal; and
      a comparator to:
         compare the analog voltage signal to an overspeed threshold signal; and
         generate a shutdown command in response to the analog voltage signal exceeding the overspeed threshold signal; and
   a valve driver to, in response to receiving the shutdown command, cause a fuel shutoff valve to cease fuel flow to the engine of the APU.

2. The APU controller of claim 1, wherein the pre-determined frequency is 4 Hertz (Hz).

3. An auxiliary power unit (APU) controller for an APU of an aircraft, the APU controller comprising:
   a sensor interface to receive a signal from a speed sensor, the signal including pulses representing a rotational speed of an output of an engine of the APU;
   an overspeed detection circuit including:
      a first counter to count a number of pulses from the signal occurring within a time interval, wherein the first counter is a 1024-bit counter;
      an oscillator and a second counter to generate timing signals at a pre-determined frequency, wherein the pre-determined frequency is 4 Hertz (Hz);
      a digital-to-analog converter (DAC) to convert the number of pulses into an analog voltage signal; and
      a comparator to:
         compare the analog voltage signal to an overspeed threshold signal; and
         generate a shutdown command in response to the analog voltage signal exceeding the overspeed threshold signal; and
   a valve driver to, in response to receiving the shutdown command, cause a fuel shutoff valve to cease fuel flow to the engine of the APU, wherein the pre-determined frequency is 4 Hertz (Hz).

4. The APU controller of claim 1, wherein the DAC is to convert the number of pulses into the analog voltage signal in response to receipt of one of the impulse signals.

5. The APU controller of claim 1, wherein the first counter is to clear the number of pulses in response to receipt of one of the impulse signals.

6. The APU controller of claim 1, wherein the overspeed detection circuit includes a delay and edge circuit that delays the impulse signals received at the first counter relative to the impulse signals received at the DAC, such that the number of pulses is converted into the analog voltage signal before the number of pulses is cleared from the first counter.

7. The APU controller of claim 1, wherein the overspeed detection circuit includes a zero-crossing detector to convert the signal from the speed sensor into a digital signal.

8. The APU controller of claim 1, wherein the overspeed detection circuit does not include a field programmable gate array (FPGA).

9. The APU controller of claim 1, wherein the first counter is a 1024-bit counter.

10. A method comprising:
    counting, via a binary-up counter, a number of pulses in a signal from a speed sensor during a time interval, the number of pulses representing a rotational speed of an engine of an auxiliary power unit (APU);
    generating, via an oscillator and a divide-by counter, timing signals at a pre-determined frequency;
    converting, via an edge circuit, the timing signals into impulse signals;
    propagating, via the edge circuit, the impulse signals to the binary-up counter and a digital-to-analog converter (DAC);
    converting, via the digital-to-analog converter (DAC), the number of pulses into an analog voltage signal;
    comparing, via a comparator, the analog voltage signal to an overspeed threshold signal; and
    generating, via the comparator, a shutdown command in response to the analog voltage signal exceeding the overspeed threshold signal.

11. The method of claim 10, wherein the analog voltage signal is proportional to the number of pulses.

12. The method of claim 11, wherein the converting of the number of pulses into the analog voltage signal is in response to receipt of one of the impulse signals.

13. The method of claim 12, further including clearing, via the binary-up counter, the number of pulses in response to receipt of one of the impulse signals.

14. The method of claim 13, further including delaying, with a delay and edge circuit, the impulse signals received by the counter relative to the impulse signals received by the DAC.

15. The method of claim 10, further including closing, via a valve driver, a fuel shutoff valve of the APU in response to receipt of the shutdown command.

16. An auxiliary power unit (APU) system of an aircraft, the APU system comprising:
   an engine;
   a speed sensor to detect a speed of the engine;
   a fuel shutoff valve to control fuel flow to the engine; and
   an APU controller including:
      an overspeed detection circuit to:
         count a number of pulses from a signal provided by the speed sensor occurring within a time interval;
         generate timing signals at a pre-determined frequency;
         convert the timing signals to impulse signals;
         convert the number of pulses into an analog voltage signal in response to detecting at least one of the impulse signals;
         determine, based on an analog voltage signal, whether a speed of the engine exceeds an overspeed threshold; and
         generate a shutdown command in response to the speed of the engine exceeding the overspeed threshold; and
      a valve driver to close the fuel shutoff valve in response to receipt of the shutdown command.

17. The APU system of claim 16, wherein the overspeed detection circuit includes a comparator to compare the analog voltage signal to an overspeed threshold signal corresponding to the overspeed threshold.

18. The APU system of claim 17, wherein the comparator is to generate the shutdown command in response to the analog voltage signal exceeding the overspeed threshold signal.

19. The APU system of claim 17, wherein the overspeed detection circuit does not include a field programmable gate array (FPGA).

* * * * *